(12) United States Patent
Tsujio

(10) Patent No.: US 6,706,782 B2
(45) Date of Patent: Mar. 16, 2004

(54) ERASABLE INK AND WATER-BASE BALLPOINT PEN USING SAME

(75) Inventor: Shinji Tsujio, Sakai (JP)

(73) Assignee: Sakura Color Products Corporation (JP)

(*) Notice: Subject to any disclaimer, the term of this patent is extended or adjusted under 35 U.S.C. 154(b) by 0 days.

(21) Appl. No.: 09/841,571

(22) Filed: Apr. 24, 2001

(65) Prior Publication Data

US 2001/0036980 A1 Nov. 1, 2001

Related U.S. Application Data

(63) Continuation of application No. 09/400,628, filed on Sep. 20, 1999, now Pat. No. 6,306,930.

(30) Foreign Application Priority Data

Sep. 25, 1998 (JP) .......................................... 10/272015

(51) Int. Cl.$^7$ ...................... C09D 11/18; C09D 101/02; C09D 105/00
(52) U.S. Cl. ................. 523/161; 106/31.32; 106/31.33; 106/31.64; 106/31.65
(58) Field of Search ............................... 523/160, 161; 106/31.32, 31.33, 31.64, 31.65; 524/565, 574, 577

(56) References Cited

U.S. PATENT DOCUMENTS

| | | | | | |
|---|---|---|---|---|---|
| 4,471,079 A | * | 9/1984 | Enami | ......................... | 523/161 |
| 4,687,791 A | * | 8/1987 | Miyajima et al. | ............ | 523/161 |
| 5,120,359 A | * | 6/1992 | Uzukawa et al. | ......... | 106/31.25 |
| 5,621,021 A | * | 4/1997 | Yoshioka et al. | ............ | 523/160 |
| 5,852,072 A | * | 12/1998 | Banning et al. | ............. | 523/161 |
| 5,976,232 A | * | 11/1999 | Gore | ........................ | 106/31.65 |
| 5,977,211 A | * | 11/1999 | Koyama | ...................... | 523/161 |

* cited by examiner

*Primary Examiner*—Callie Shosho
(74) *Attorney, Agent, or Firm*—Baker Botts LLP

(57) ABSTRACT

The invention provides an aqueous ink composition which can be erased relatively easily even after writing with a great tool force. The invention relates to (1) an erasable aqueous ink composition containing at least one colorant, characterized in that the colorant has a mean particle size of not less than 2 $\mu$m and that particles having a size of not more than 1.8 $\mu$m account for not more than 1.6% by weight of said colorant; (2) an erasable aqueous ink composition containing at least one colorant, characterized in that the colorant has a mean particle size of not more than 7 $\mu$m and that particles having a size of not less than 7 $\mu$m account for not more than 0.5% by weight of said colorant and (3) an erasable aqueous ink composition containing at least one colorant, characterized in that the colorant has a mean particle size of 2 to 7 $\mu$m, that particles having a size of not more than 1.8 $\mu$m account for not more than 1.6% by weight of said colorant and that particles having a size of not less than 7 $\mu$m account for not more than 0.5% by weight of said colorant.

10 Claims, No Drawings

ERASABLE INK AND WATER-BASE BALLPOINT PEN USING SAME

This application is a continuation of application Serial No. 09/400,628, filed Sep. 20, 1999, now U.S. Pat. No. 6,306,930, which is incorporated here by reference.

FIELD OF THE INVENTION

The present invention relates to a novel species of erasable ink and a water-base ballpoint pen in which said ink is used.

BACKGROUND OF THE INVENTION

Erasable ink is characterized in that when letters, characters, figures or drawings are written or drawn on paper in such ink, the lines drawn can be erased with a rubber eraser. It is currently used in felt-tip pens and the like.

Such erasable inks are already known. There is known, for instance, an erasable ink composition characterized in that it comprises a resin having a film-forming temperature not higher than 0° C. or a glass transition temperature not higher than 0° C., spherical particles of a colored resin having a particle size of 1 to 20 μm and water and has an ink viscosity of 5 to 35 mPa·sec (Japanese Kokai Tokkyo Koho H05-279614).

In the case of said erasable ink composition, however, it is difficult to erase drawn lines completely and, from the erasability viewpoint, there is room for improvement. In particular, when writing is made with a great tool force, it is impossible to erase the drawn lines to the extent that they cannot be recognized any longer. This problem becomes more serious when such composition is used as ink for ballpoint pens with which the tool force tends to become high. Furthermore, when the ink composition mentioned above is to be used as ink for ballpoint pens, it tends to fail to flow out successfully, hence, as it is, such composition cannot be used in ballpoint pens.

SUMMARY OF THE INVENTION

Accordingly, an object of the present invention is to provide an erasable ink composition which can be erased in a relatively easy manner even when writing has been made with a great tool force. Another object of the invention is to provide a water-base ballpoint pen in which said ink composition is used.

As the result of intensive investigations made by the present inventor in an attempt to solve the above problems of the prior art, it was found that the above objects can be accomplished by employing an ink composition containing a colorant whose particle size is controlled within a certain range. Based on this and other findings, the present invention has now been completed.

The present invention thus provides an erasable ink composition and a water-base ballpoint pen in which said ink composition is used, as specified below:

1. An erasable aqueous ink composition containing at least one colorant, characterized in that said colorant has a mean particle size of not less than 2 μm and that particles having a size of not more than 1.8 μm account for not more than 1.6% by weight of said colorant.
2. An erasable aqueous ink composition containing at least one colorant, characterized in that said colorant has a mean particle size of not more than 7 μm and that particles having a size of not less than 7 μm account for not more than 0.5% by weight of said colorant.
3. An erasable aqueous ink composition containing at least one colorant, characterized in that said colorant has a mean particle size of 2 to 7 μm, that particles having a size of not more than 1.8 μm account for not more than 1.6% by weight of said colorant and that particles having a size of not less than 7 μm account for not more than 0.5% by weight of said colorant.
4. A water-base ballpoint pen in which the ink composition specified above under any of paragraphs 1 to 3 is used.

DETAILED DESCRIPTION OF THE INVENTION

The colorant is not limited to any particular species on the condition that the particle size distribution conditions to be described later herein in more detail be met. Thus, those colorants which are used in known aqueous ink compositions or the like can be employed. For example, inorganic pigments such as titanium oxide, carbon black, ultramarine blue, cobalt blue, chromium oxide, iron oxide red and graphite as well as organic pigments such as C.I. pigment black 1, C.I. pigment green 7, C.I. pigment blue 15, C.I. pigment red 112 and C.I. pigment violet 19 can be used. In addition, fluorescent pigments, luminescent pigments and the like can also be used. Furthermore, the so-called colored resin beads can be used as the colorant in the practice of the present invention. As the colored resin beads, there may be mentioned, for example, resin beads (e.g. of an acrylic resin or a styrenic resin) containing a dye or pigment, resin beads colored with a dye etc. Further, in the practice of the present invention, toners for copying may also be used. These colorants may be used either singly or in combination of two or more of them. Among them, the use of colored resin beads is preferred.

In the practice of the present invention, it is necessary for these colorants to be controlled with respect to their particle size as follows. Thus, it is required that the colorant have a mean particle size of not less than 2 μm and particles having a size of not more than 1.8 μm account for not more than 1.6% by weight on the colorant basis, or that the colorant have a mean particle size of not more than 7 μm and particles having a size of not less than 7 μm account for not more than 0.5% by weight on the colorant basis.

In the practice of the present invention, it is particularly preferred that the colorant have a mean particle size of 2 to 7 μm (more preferably 2 to 5 μm), with particles having a size of not more than 1.8 μm accounting for not more than 1.6% by weight on the colorant basis and particles having a size of not less than 7 μm accounting for not more than 0.5% by weight, preferably not more than 0.1% by weight, on the colorant basis. This particle size control can be realized by any known classification technique such as spontaneous sedimentation, centrifugation or filter filtration.

The term "mean particle size" as used herein means the weight average particle size. Thus, the weight cumulative distribution is determined by the liquid phase precipitation method in the light transmission mode (measuring apparatus: Horiba Seisakusho model CAPA-700) and the particle size at 50 weight percent distribution is reported as the mean particle size. The precipitation is caused by centrifugation. The specific gravity of the colorant particles is calculated using the true specific gravity thereof.

The shape of the colorant (particle) is not critical but may be spherical, polyhedral, flaky or fibrous, for instance. In the practice of the present invention, however, a basically spherical form is preferred and, in particular, it is preferred that the shape be as close as possible to the true sphere.

The content of the colorant may be judiciously selected in consideration of the other components employed and, generally, it is about 1 to 40% by weight, preferably 3 to 20% by weight. When it is above 40% by weight, the viscosity will become excessively high, so that the ink will flow out with difficulty. When said content is less than 1% by weight, sufficient coloration may not be attained in some instances.

The erasable ink composition of the present invention may further contain a water-soluble polymer. If it is soluble in water, it may be a natural, synthetic or semisynthetic one for instance. Those known polymers which are used as gelling agents in gel ink compositions may also be used as they are. Such polymers may be used either singly or in combination. Among them, xanthan gum, carboxymethylcellulose, guar gum, pullulan, rhamsan gum, welan gum, succinoglucan and like polysaccharides are preferred, and those polysaccharides represented by the following general formula are more preferred.

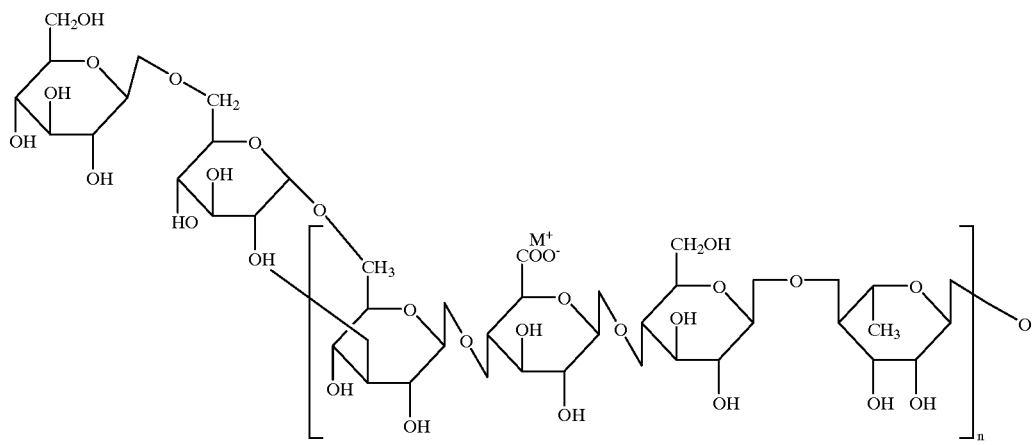

(In the above formula, M represents an alkali metal selected from among sodium, potassium and lithium, and n is 1,000 to 3,000.)

The polysaccharides represented by the above general formula can provide ink compositions with excellent thixotropic properties, stringiness and dischargeability, among others. As the polysaccharides giving such characteristics, commercial products, for example "rhamsan gum" (available from Sansho Corp.), can be used. This polysaccharide (rhamsan gum) gives especially excellent tixotropic properties and can provide ink compositions with adequate viscosity and dischargeability characteristics more effectively. Owing to this, an ink composition for ballpoint pen in which rhamsan gum is used shows a high ink viscosity in ink tanks, so that the ink composition will not leak from the pen point or colorant separation will not occur, either. On the other hand, when a shearing force is applied to said composition as a result of ball spinning on the occasion of writing, the ink viscosity is reduced and good dischargeability is thereby attained.

The content of the water-soluble polymer may adequately be selected in consideration of the other components employed and, generally, it is about 0.1 to 4% by weight, preferably 0.2 to 0.6% by weight. When it is above 4% by weight, the viscosity will become excessively high, worsening the dischargeability of the ink. When it is less than 0.1% by weight, the ink may undergo phase separation.

In the practice of the present invention, various additives generally used in aqueous ink compositions, for example dispersing agents, wetting agents, preservatives, antifungal agents, rust preventing agents, viscosity modifiers and pH adjusting agents, if necessary, may also be incorporated in appropriate amounts.

Useful as the dispersing agents, which are used especially for increasing the dispersibility of colorants, are, for example, anionic surfactants such as sodium naphthalenesulfonate-formaldehyde condensates, higher alcohol sulfate sodium salts and sodium alkylbenzenesulfonates, and nonionic surfactants such as polyethylene glycol alkyl ethers, polyethylene glycol alkylphenyl ethers and polyethylene glycol lauryl ether. These may be used either singly or in combination. Among them, anionic surfactants are preferred and, in particular, sodium naphthalenesulfonate-formaldehyde condensates are more preferred. The level of addition of the dispersing agents is generally about 0.01 to 1% by weight, preferably 0.1 to 0.5% by weight.

The wetting agents are used especially for adjusting the rate of drying of ink compositions within a desired range. By adding a wetting agent, it becomes possible to further improve the storability and cap off performance (performance after standing without the cap), among others. Specifically, use may be made of dihydric alcohols such as ethylene glycol, diethylene glycol, triethylene glycol, polyethylene glycol, 1,8-propanediol, propylene glycol, 1,3-butylene glycol, 1,4-butanediol, 2,3-butylene glycol, neopentyl glycol, hexylene glycol and thiodiglycol, polyhydric alcohols such as glycerin, trimethylolethane, trimethylolpropane, 3-methylpentane-1,3,5-triol, diglycerin and sorbite, glycol ethers such as ethylene glycol monomethyl ether, ethylene glycol monoethyl ether, ethylene glycol monobutyl ether, ethylene glycol monobutyl ether, diethylene glycol monomethyl ether and diethylene glycol monobutyl ether and, further, pyrrolidone, N-methyl-2-pyrrolidone, dimethylformamide and the like. These may be used either singly or in combination. Among them, ethylene glycol, propylene glycol, glycerin and the like are preferred. The level of addition of such wetting agents is generally about 1 to 30% by weight, preferably 2 to 25% by weight.

Useful as the preservatives/antifungal agents are, for example, potassium sorbate, sodium benzoate, pentachlorophenol sodium, sodium dehydroacetate, 1,2-benzisothiazolin-3-one, 2,3,5,6-tetrachloro-4-(methylsulfonyl)pyridine, benzimidazole compounds and the like. These may be used either singly or in combination. Among them, sodium benzoate and the like are preferred. The level of addition of such preservatives/antifungal agents is generally about 0.2 to 3% by weight, preferably 0.5 to 2% by weight.

In the practice of the present invention, those resins which are known as film-forming resins may judiciously be added within limits within which the effects of the present invention are not sacrificed. As such resins, there may be mentioned synthetic rubbers such as styrene-butadiene rubbers, acrylonitrile-butadiene rubbers and chloroprene rubbers, and natural rubbers such as latices. These may be used either singly or in combination. The level of addition of such resins is generally about 10 to 30% by weight, preferably 15 to 25% by weight.

As for the solvent for the ink composition of the present invention, any of those currently used in known aqueous ink compositions, for example water (or an aqueous solvent), may by used. In that case, the amount of water may be adequately selected according to the desired viscosity, the other components and addition levels thereof, and other factors. Generally, water is used in an amount of about 60 to 95% by weight, preferably 70 to 80% by weight, in total.

The viscosity of the ink composition of the present invention may be selected depending on the intended use of the final products and other factors. Generally, it is recommended that the viscosity be about 100 to 10,000 mPa·s, preferably 500 to 5,000 mPa·s. The viscosity can be adequately adjusted by appropriate incorporation of the respective components or ingredients. The ink viscosity as so referred to herein is the value measured by using an ELD type viscometer under the conditions of 3° (R14) cone, 0.5 revolution per minute (rpm) and 20° C.

The ink composition of the present invention can be prepared basically in the same manner as in the production of known aqueous ink compositions. Thus, for example, the components other than the colorant and dispersing agent are added to water and then the colorant with an adjusted particle size distribution is gradually added with stirring. The particle size distribution adjustment of the colorant can be effected by adding a dispersing agent as necessary to the colorant such as a pigment or colored resin beads, diluting the mixture with water with stirring and then subjecting the thus-obtained dispersion to classification by centrifugation, for instance.

The ink composition of the present invention can be used in substantially all sorts of writing tools and printing, for instance. As far as the writing tools are concerned, it can be used universally in marker pens, felt-tip pens, ballpoint pens and the like. In particular, owing to its excellent erasability, it is best suited for use in ballpoint pens (water-base ballpoint pens).

The water-base ballpoint pen of the present invention may be composed of those known ballpoint pen parts except for the use of the erasable ink composition of the present invention as the ink. The ink container tube or pipe, for instance, may be of the same material and size as those in conventional use. As regards the material of the ink container pipe, synthetic resin pipes made of polyethylene, polypropylene or the like and, further, metal pipes can be employed. As for the ballpoint pen tip, the same material and structure as used in any known water-base ballpoint pen can be employed.

The ballpoint pen can be assembled by the conventional method of assembling ballpoint pens. Thus, for instance, an ink container pipe made of polypropylene with a German silver ballpoint pen tip (material of the ball: e.g. cemented carbide, ceramic) mounted at one end is filled with the erasable ink composition of the present invention to give a ballpoint pen refill. Then, said refill is attached to the main body, a tail stopper is then mounted, and the air within the ballpoint pen refill pipe is withdrawn by means of a centrifuge, to give the water-base ballpoint pen of the present invention.

The erasable ink composition of the present invention contains a colorant whose particle size distribution is particularly controlled within a specific range and therefore can improve erasability while maintaining good fixability.

Owing to the excellent erasability, lines written on paper or the like with said ink composition can be erased with ease using a rubber eraser. In particular, even when writing is made with a great tool force, the lines can be erased with ease. In this respect, the ink composition of the present invention is best suited for use as an ink composition for ballpoint pens with which the tool force becomes relatively great.

On the other hand, said ink composition has good fixability, so that mere rubbing with a finger cannot erase the drawn lines. Furthermore, such drawn lines are excellent in stability with time; they will not become difficult to erase with the lapse of time. After the lapse of one month, for instance, they can be erased easily using a rubber eraser.

In the case of the ink composition of the present invention, a predetermined level of erasability can be obtained without using any film-forming resin and, therefore, such problems as decrease in erasability due to deterioration of the film-forming resin after writing, separation of the film-forming resin in the ink composition during storage and solidification of the film-forming resin at the pen point can be solved all at once. Thus, the ink composition of the present invention can produce excellent effects from the viewpoints of stability with time, storability, ink dischargeability, cap off performance and other properties as well.

In addition, when the ink composition of the present invention is gelled with a water-soluble polymer, more improved effects are produced concerning the stability with time, storability, ink dischargeability, cap off performance and other properties. Therefore, unlike the conventional erasable ink compositions, the ink composition of the present invention never causes separation or sedimentation nor causes clogging within the pen. Furthermore, it is excellent in ink dischargeability, so that drawn lines will not show any interruption. As regards the cap off performance, unlike the conventional erasable ink compositions which contain a relatively large amount of a film-forming resin and therefore cause film formation at the pen point, making it impossible to use the pen any longer, it is possible with the ink composition of the present invention to perform writing even after 24 hours of standing in an uncapped state, for instance.

The erasable ink composition of the present invention, which has such characteristic features, is useful as an ink composition for felt-tip pens, marker pens or the like and for use in printing. In particular, the ink composition of the present invention is best suited as an ink composition for ballpoint pens.

EXAMPLES

The following examples and comparative examples further illustrate the characteristic features of the present invention.

Example 1

A dilute dispersion was prepared by placing a colorant (blue resin beads (product of Soken Chemical, resin: acrylic resin, dye: Sudan blue B), together with water, in a Disper dispersion apparatus and stirring for 3 hours. The dispersion obtained was classified by centrifugation to thereby adjust the particle size within the range of 2.5 to 4 $\mu$m. Separately, a solution was prepared by dissolving and mixing 0.35 parts by weight of rhamsan gum (as a water-soluble polymer), 3.5 parts by weight of ethylene glycol (as a wetting agent), 0.5 part by weight of sodium naphthalenesulfonate-formaldehyde condensate (as a dispersing agent) and 1 part by weight of sodium benzoate (as a preservative) in water. To this solution was added gradually with stirring 15 parts by weight of the classified colorant and, after completion of the addition, stirring was still continued for 3 hours, to give an ink composition. The total amount of water in this ink composition was 79.65 parts by weight.

Example 2

An ink composition was prepared in the same manner as in Example 1 except that the colorant, water-soluble polymer, wetting agent and preservative specified below were used, together with water, in the respective proportions specified below. As for the particle size of the colorant, particles having a size of 0.5 to 4.5 μm were classified in the same manner as in Example 1 to thereby eliminate the particles having a size not more than 2 μm.

|  | Weight parts |
| --- | --- |
| Colorant: Ultramarine blue (Blue 02; product of Holiday Pigments) | 10 |
| Water-soluble polymer: Xanthan gum | 0.4 |
| Wetting agent: Glycerin | 5 |
| Dispersing agent: Sodium naphthalene-sulfonate-formaldehyde condensate | 0.5 |
| Preservative: Sodium benzoate | 1 |
| Water | 83.1 |

Example 3

An ink composition was prepared in the same manner as in Example 1 except that the colorant, water-soluble polymer, wetting agent and preservative specified below were used, together with water, in the respective proportions specified below. As for the particle size of the colorant, particles having a mean size of 5.9 μm were classified in the same manner as in Example 1 to thereby adjust the particle size range to 2.5 to 7 μm.

|  | Weight parts |
| --- | --- |
| Colorant: Black toner (MBX-5; product of Sekisui Chemical Co.) | 7 |
| Water-soluble polymer: Welan gum | 2 |
| Wetting agent: Diethylene glycol | 7.5 |
| Dispersing agent: Polyethylene glycol alkylphenyl ether | 0.1 |
| Preservative: Sodium benzoate | 1 |
| Water | 82.4 |

Example 4

An ink composition was prepared in the same manner as in Example 1 except that the colorant, water-soluble polymer, wetting agent and preservative specified below were used, together with water, in the respective proportions specified below and that a resin was further added. As for the particle size of the colorant, particles having a mean size of 7.1 μm were classified in the same manner as in Example 1 to thereby adjust the particle size range to 1.8 to 6 μm.

|  | Weight parts |
| --- | --- |
| Colorant: Blue resin beads (Daipla Coat Blue, product of Dainichiseika, resin: urethane resin; pigment: cyanine blue) | 10 |
| Water-soluble polymer: Rhamsan gum | 0.3 |
| Wetting agent: Diethylene glycol | 7.5 |
| Dispersing agent: Sodium naphthalene-sulfonate-formaldehyde condensate | 0.1 |
| Preservative: Sodium benzoate | 1 |
| Resin: Styrene-butadiene rubber | 20 |
| Water | 61.1 |

Comparative Example 1

An ink composition was prepared in the same manner as in Example 1 except that the colorant, water-soluble polymer, wetting agent and preservative specified below were used, together with water, in the respective proportions specified below. The colorant had a mean particle size of 0.03 μm.

|  | Weight parts |
| --- | --- |
| Colorant: Carbon black (Carbon Black #30, product of Mitsubishi Chemical) | 3 |
| Water-soluble polymer: Rhamsan gum | 0.35 |
| Wetting agent: Ethylene glycol | 10 |
| Dispersing agent: Sodium naphthalene-sulfonate-formaldehyde condensate | 0.5 |
| Preservative: Sodium benzoate | 1 |
| Water | 85.15 |

Comparative Example 2

An ink composition was prepared in the same manner as in Example 1 except that the colorant, water-soluble polymer, wetting agent and preservative specified below were used, together with water, in the respective proportions specified below. The colorant had a mean particle size of 20.2 μm.

|  | Weight parts |
| --- | --- |
| Colorant: Black resin beads (Lovecolor 020, product of Dainichiseika; resin: acrylic resin; colorant: carbon black) | 15 |
| Water-soluble polymer: Xanthan gum | 0.4 |
| Wetting agent: Glycerin | 5 |
| Dispersing agent: Sodium naphthalene-sulfonate-formaldehyde condensate | 0.5 |
| Preservative: Sodium benzoate | 1 |
| Water | 78.1 |

Comparative Example 3

An ink composition was prepared in the same manner as in Example 1 except that the colorant, water-soluble polymer, wetting agent and preservative specified below were used, together with water, in the respective proportions specified below. The colorant had a mean particle size of 3.67 μm, with particles having a size of not more than 1.8 μm accounting for 5.5% by weight and particles having a size of 7 μm accounting for 1.4% by weight.

|  | Weight parts |
| --- | --- |
| Colorant: Fluorescent blue resin beads (Epocolor FP1050, product of Nippon Shokubai) | 15 |
| Water-soluble polymer: Rhamsan gum | 0.35 |
| Wetting agent: Ethylene glycol | 3.5 |
| Dispersing agent: Sodium naphthalene-sulfonate-formaldehyde condensate | 0.5 |
| Preservative: Sodium benzoate | 1 |
| Water | 79.65 |

Test Example 1

Using the respective ink compositions obtained in the above examples and comparative examples, water-base ballpoint pens were produced. These ballpoint pens were evaluated with respect to erasability, fixability, ink dischargeability, storability and cap off performance. The results obtained are shown below in Table 1. The respective performance characteristics were evaluated in the following manner.

(1) Erasability

The erasability is expressed in terms of color density Y as determined by means of a colorimeter (Minolta model CR-241). The greater the value of Y is, the higher the erasability is.

(2) Fixability

Using each water-base ballpoint pen, writing is made on quality paper and, after drying, the drawn lines are rubbed with a finger. The extent of blurring of the drawn lines is compared with those of lines written with pencils, and the corresponding grade of pencil is reported. The load for writing with pencils is 500 grams. The following criteria are used:

◯: Blurring less than that observed in the case of a 2H or harder pencil;

Δ: About 2H to 2B;

×: Blurring more intense than that observed in the case of a 2B or softer pencil.

(3) Ink Dischargeability

Writing is made on quality paper using each ballpoint pen and the amount of the ink discharged (mg/100 m) is reported.

(4) Storability

Each water-base ballpoint pen is stored at 50° C. for a month and then examined for the occurrence or nonoccurrence of phase separation of ink and for ink dischargeability (in terms of clogging, line interruption and density). The evaluation criteria used are as follows:

◯: No phase separation of ink; good ink dischargeability;

Δ: Slight phase separation of ink; ink dischargeability questionable;

×: Phase separation is severe, so that practical use of the pen is quite impossible.

(5) Cap Off Performance

Each water-base ballpoint pen is uncapped and allowed to stand in that state for 1 hour and then examined for the writing performance. The evaluation criteria are as follows:

◯: Writing is immediately effective;

Δ: writing becomes effective within 3 letters;

×: Writing is impossible even after 20 letters.

Each letter written or intended to be written is "A" in a square measuring 1 cm long by 1 cm broad.

TABLE 1

| | Eras-ability | Fix-ability | Ink discharge-ability (mg) | Stor-ability | Cap off performance |
|---|---|---|---|---|---|
| Example 1 | 71.2 | ◯ | 150 | ◯ | ◯ |
| Example 2 | 69.5 | ◯ | 120 | ◯ | ◯ |
| Example 3 | 69.1 | Δ | 115 | ◯ | ◯ |
| Example 4 | 70.3 | ◯ | 110 | ◯ | Δ |
| Compar. Ex.1 | 18.2 | ◯ | 140 | ◯ | ◯ |
| Compar. Ex.2 | 69.6 | × | <30 | ◯ | × |
| Compar. Ex.3 | 62.4 | Δ | 75 | Δ | Δ |

From the results shown in Table 1, it is seen that the ballpoint pens of Comparative Examples 1 to 3, in which the colorant particle size was not controlled within the specified range, showed an insufficiency in at least one aspect among erasability, fixability, ink dischargeability and so on.

On the contrary, the ink compositions of the present invention, each comprising a gelled ink composition with a controlled particle size, were found to be excellent in erasability and at the same time capable of producing excellent effects with respect to ink dischargeability, fixability and so on.

What is claimed is:

1. An erasable aqueous ink composition comprising at least one colorant and at least one film-forming resin, wherein said colorant has a mean particle size of 2 to 7 μm and wherein particles having a size of not more than 1.8 μm account for not more than 1.6% by weight of said colorant and wherein particles having a size of not less than 7 μm account for not more than 0.5% by weight of said colorant and wherein the composition has a viscosity of 500–5000 mPa's as determined by using an ELD viscometer (3°(D2(R 14 cone), 0.5rpm (20° C.)).

2. An erasable aqueous ink composition as claimed in claim 1 wherein the content of the colorant in said ink composition is 1 to 40% by weight.

3. An erasable aqueous ink composition as claimed in claim 1 which comprises a water-soluble polymer.

4. An erasable aqueous ink composition as claimed in claim 3 wherein the water-soluble polymer is present in an amount of 0.1 to 4% by weight, based on the ink composition.

5. An erasable aqueous ink composition as claimed in claim 1 which comprises a polysaccharide.

6. An erasable aqueous ink composition as claimed in claim 1 which comprises at least one polysaccaharide selected from the group consisting of xanthan gum, carboxymethylcelluloee, guar gum, pullulan, rhamsan gum, welan gum and succinoglucan.

7. A water-base ballpoint pen comprising an ink composition according to claim 1.

8. An erasable aqueous ink composition as claimed in claim 1, wherein the colorant is at least one selected from the group consisting of titanium oxide, carbon black, ultramarine blue, cobalt blue, chromium oxide, iron oxide red, graphite, C.I. pigment black 1, C.I. pigment green 7, C.I. pigment blue 15, C.I. pigment red 112and C.I. pigment violet 19.

9. An erasable aqueous ink composition as claimed in claim 1, wherein the colorant is colored resin beads.

10. An erasable aqueous ink composition as claimed in claim 1, wherein the film-forming resin is at least one selected from the group consisting of styrene-butadiene rubbers, acrylonitrile-butadiene rubbers, chloroprene rubbers and latices.

* * * * *